(12) United States Patent
Peng et al.

(10) Patent No.: US 7,766,492 B2
(45) Date of Patent: Aug. 3, 2010

(54) PROJECTOR WITH ENHANCED GROUNDING EFFECT

(75) Inventors: Jung-Hsing Peng, Taoyuan County (TW); Hsien-Chen Lee, Kaohsiung (TW)

(73) Assignee: Qisda Corporation, Taoyuan County (TW)

( * ) Notice: Subject to any disclaimer, the term of this patent is extended or adjusted under 35 U.S.C. 154(b) by 893 days.

(21) Appl. No.: 11/615,913

(22) Filed: Dec. 22, 2006

(65) Prior Publication Data

US 2008/0239254 A1 Oct. 2, 2008

(30) Foreign Application Priority Data

Apr. 19, 2006 (TW) .............................. 95113914 A

(51) Int. Cl.
*G03B 21/14* (2006.01)
(52) U.S. Cl. ...................................................... 353/119
(58) Field of Classification Search ................. 349/5–9; 353/119
See application file for complete search history.

(56) References Cited

U.S. PATENT DOCUMENTS

| | | | |
|---|---|---|---|
| 6,390,628 B1 * | 5/2002 | Fujimori et al. ............. | 353/119 |
| 6,407,347 B1 * | 6/2002 | Blakesley ................... | 177/144 |
| 6,793,343 B2 * | 9/2004 | Nakano et al. ............... | 353/61 |
| 6,793,346 B2 * | 9/2004 | Nakano et al. .............. | 353/119 |
| 6,866,387 B2 * | 3/2005 | Ogawa ........................ | 353/20 |
| 6,871,964 B2 * | 3/2005 | Peng ........................... | 353/119 |
| 6,880,938 B2 * | 4/2005 | Nakano ....................... | 353/119 |
| 6,957,892 B2 * | 10/2005 | Kuroda ........................ | 353/61 |
| 6,976,856 B2 * | 12/2005 | Peng et al. ..................... | 439/95 |
| 7,018,048 B2 * | 3/2006 | Ito et al. ........................ | 353/57 |
| 7,061,699 B2 * | 6/2006 | Watanabe et al. ........... | 359/819 |
| 7,140,739 B2 * | 11/2006 | Ogawa et al. ............... | 353/119 |
| 7,156,526 B2 * | 1/2007 | Tanaka ........................ | 353/119 |
| 7,553,027 B2 * | 6/2009 | Tang et al. ..................... | 353/33 |
| 2003/0174288 A1 * | 9/2003 | Nakano ........................ | 353/31 |
| 2004/0239897 A1 * | 12/2004 | Ogawa et al. ............... | 353/119 |
| 2005/0110962 A1 * | 5/2005 | Watanabe et al. ........... | 353/119 |
| 2005/0179876 A1 * | 8/2005 | Iinuma et al. ............... | 353/119 |

\* cited by examiner

*Primary Examiner*—William C Dowling

(57) ABSTRACT

A projector comprises a light machine, a housing accommodating the light machine, a circuit board disposed above the light machine, a semi-sealed shell covering the circuit board, a copper post supporting the semi-sealed shell and connecting the housing and the semi-sealed shell, and at least one contact element contacting the copper post to prevent electromagnetic interference.

10 Claims, 2 Drawing Sheets

PROJECTOR WITH ENHANCED GROUNDING EFFECT

BACKGROUND OF THE INVENTION

1. Field of the Invention

The invention relates to a projector, and in particular relates to a projector with electromagnetic interference reduction.

2. Description of the Related Art

In general, a projector has a light machine normally comprising two holes formed on the back allowing calibration. No elements can be disposed on the back of the light machine. In addition, to reduce costs, a main circuit board, rather than a high-cost flexible print circuit board, is utilized to drive digital micromirror devices, and must generally be disposed above the light machine.

In such a structure, electromagnetic interference (EMI) may occur. The circuit board is covered by a sealed or semi-sealed shell to avoid EMI. Because the circuit board has many wires extending therefrom, a semi-sealed shell is preferred. A copper post connects the semi-sealed shell to a housing of the projector, whereby noise is directed to the housing to prevent EMI.

The structure described has more grounding points than conventional projectors and thus provides a good grounding function. As mentioned, since no element can be disposed on the back of the light machine, the main circuit board and the semi-sealed shell are only supported by the copper post, which stands alone without other contacting elements, thus acting as an antenna and generating additional EMI problems.

When the main circuit board emits electromagnetic waves, every $\lambda/4$ position ($\lambda$ being the wavelength of the electromagnetic wave) a grounding point is required to avoid EMI. The correlation between $\lambda$, light speed c and frequency f is $\lambda=c/f$. For example, when f is 1 GHz, $\lambda$ is 30 cm, and $\lambda/4$ is 7.5 cm. The copper post, at 10 cm exceeding $\lambda/4$ (7.5 cm), acts as an antenna a emitting electromagnetic waves, becoming another EMI source.

BRIEF SUMMARY OF INVENTION

A detailed description is given in the following embodiments with reference to the accompanying drawings.

An embodiment of the projector of the invention comprises a light machine, a housing accommodating the light machine, a circuit board disposed above the light machine, a semi-sealed shell covering the circuit board, a copper post supporting the semi-sealed shell and connecting the housing, and at least one contact element contacting the copper post to prevent electromagnetic interference.

In the embodiment, the contact element comprises a linear portion, a curved portion and a hook portion. The linear portion is fixed to the light machine, the curved portion contacts the copper post, and the hook portion abuts the light machine.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The following description is made for the purpose of illustrating the general principles of the invention and should not be taken in a limiting sense. The scope of the invention is best determined by reference to the appended claims.

Figure 1:
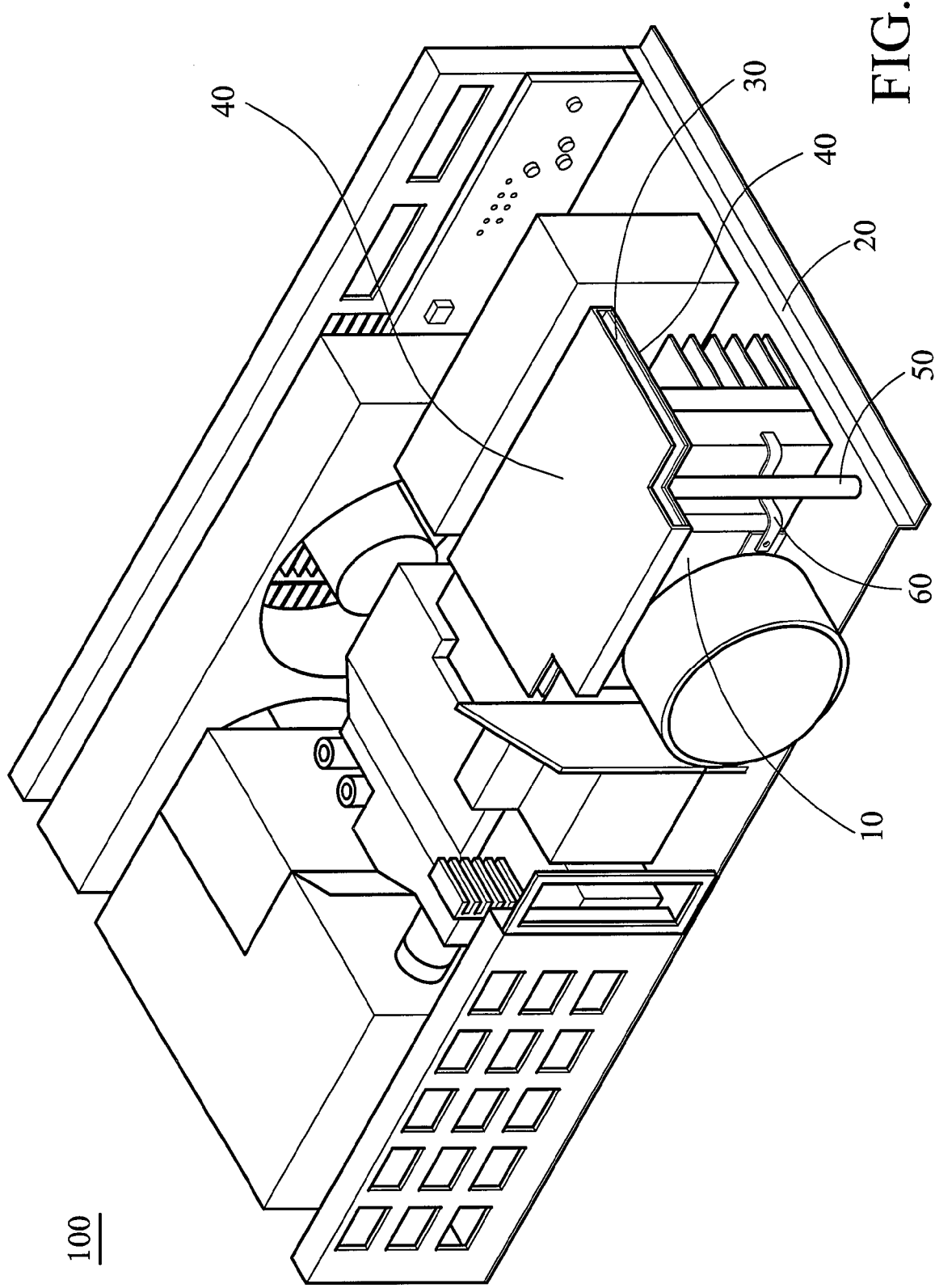
FIG. 1 is a schematic view of a projector of the invention.

Referring to FIG. 1, a projector 100 comprises a light machine 10, a housing 20 accommodating the light machine 10, a circuit board 30, a shell 40, a copper post 50 and a contact element 60. The housing 20 and the shell 40 are metal. The circuit board 30 is inserted into the top of the light machine 10. The shell 40 is semi-sealed and covers the top and bottom of the circuit board 30. The shell 40 is supported by the copper post 50 and connected thereby to the housing 20, whereby electromagnetic waves generated by the circuit board are directed to the housing 20 via the shell 40 and the copper post 50.

Figure 2:
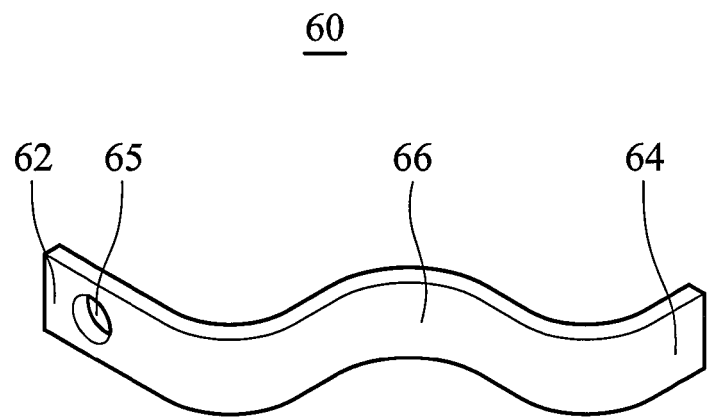
FIG. 2 is a schematic view of a contact element of FIG. 1.
Figure 3:
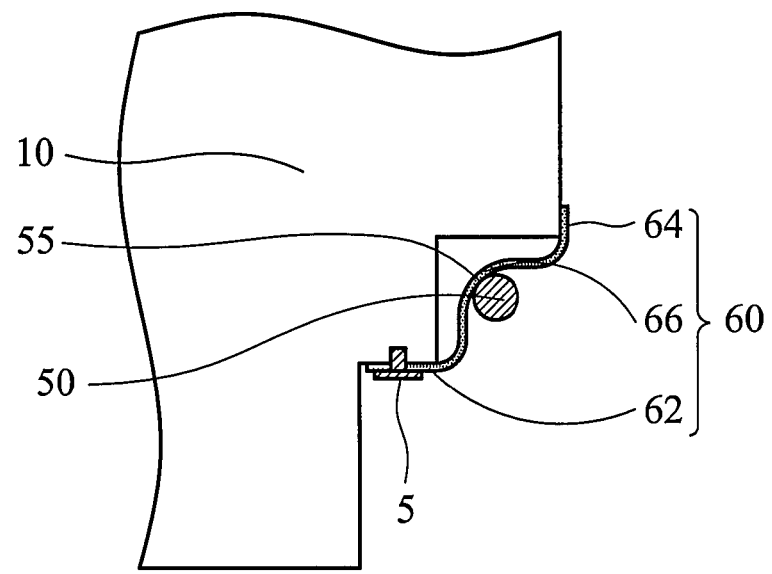
FIG. 3 is a top view of the contact element of FIG. 2 mounted in the projector.

The contact element 60 is metal. The contact element 60 is fixed to the light machine 10 and contacts the copper post 50. In this embodiment, the contact element 60 has a substantially curved shape as shown in FIG. 2 and comprises a linear portion 62 at one end, a hook portion 64 at the other end and a curved portion 66 in the middle thereof. A through hole 65 is formed on the linear portion 62. FIG. 3 depicts the contact element 60 mounted in the projector 100, wherein a bolt 5, through the through hole 65, fixes one end of the contact element 60 to the light machine 10. The curved portion 66 contacts the copper post 50, and the hook portion 64 abuts the light machine 10. The contact element 60 is fitted between the light machine 10 and the copper post 50 to make contact therebetween.

The contact element 60 is not limited to the described shape and position. It is applicable as long as the copper post 50 contacts certain elements of the projector 100. The contact element 60 contacts the copper post 50 at a contact point 55, dividing the copper post 50 into two sections. Each section is smaller than the critical length of EMI, such as the described $\lambda/4$ (7.5 cm), whereby the antenna effect of the copper post 50 is avoided. If the copper post 50 is long, a plurality of contact elements 60 is applicable to divide the copper post 50 into multiple sections shorter than the critical length of EMI, respectively.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A projector, comprising
    a light machine;
    a housing accommodating the light machine;
    a circuit board disposed above the light machine;
    a semi-sealed shell covering the circuit board;
    a copper post supporting the semi-sealed shell and connecting the housing and the semi-sealed shell; and
    at least one contact element disposed on the light machine and contacting the copper post by at least one contact point to prevent electromagnetic interference.

2. The projector as claimed in claim 1, wherein one end of the contact element is fixed to the light machine.

3. The projector as claimed in claim 2, wherein the contact element comprises a linear portion fixed to the light machine.

4. The projector as claimed in claim 1, wherein the contact element comprises a linear portion fixed to the light machine.

5. The projector as claimed in claim 4, wherein the contact element further comprises a curved portion contacting the copper post.

6. The projector as claimed in claim 5, wherein the contact element further comprises a hook portion abutting the light machine.

7. The projector as claimed in claim 1, wherein the contact element comprises metal.

8. The projector as claimed in claim 1, wherein the contact point divides the copper post into sections, each shorter than a critical length.

9. The projector as claimed in claim 8, wherein the critical length is ¼ the wavelength of electromagnetic waves emitted from the copper post.

10. The projector as claimed in claim 1, wherein the contact element is disposed between the copper post and the light machine.

* * * * *